United States Patent [19]
Pagano

[11] Patent Number: 5,229,804
[45] Date of Patent: Jul. 20, 1993

[54] FILM ASSEMBLAGE

[75] Inventor: Daniel M. Pagano, Henrietta, N.Y.

[73] Assignee: Eastman Kodak Company, Rochester, N.Y.

[21] Appl. No.: 853,233

[22] Filed: Mar. 16, 1992

[51] Int. Cl.$^5$ .............................................. G03B 17/26
[52] U.S. Cl. ..................... 354/275; 242/71.1
[58] Field of Search ................ 354/275, 212; 242/71.1

[56] References Cited
U.S. PATENT DOCUMENTS

| | | | |
|---|---|---|---|
| 780,288 | 1/1905 | Hahn | 5/416 |
| 2,188,779 | 1/1940 | Roehrl | 430/501 |
| 3,433,637 | 3/1969 | Bachelder | 430/501 |
| 3,515,558 | 6/1970 | Winkler | 430/501 |
| 3,573,047 | 3/1971 | Jeffee | 430/403 |
| 3,986,879 | 10/1976 | Klinkhammer | 430/501 |
| 4,391,902 | 7/1983 | Wilde | 430/501 |
| 4,445,768 | 5/1984 | Gold | 354/275 |

Primary Examiner—David M. Gray
Attorney, Agent, or Firm—Roger A. Fields

[57] ABSTRACT

A film assemblage comprises an elongate filmstrip and a relatively shorter leader adhered together at respective overlapping areas and adapted to be wound onto a take-up spool in a camera beginning with the leader and followed by the filmstrip. The filmstrip and/or the leader has a hole located and dimensioned relative to the overlapping areas to receive at least one of the overlapping areas when the leader and the filmstrip are wound onto a take-up spool in a camera. Since one of the overlapping areas is located in the hole when the filmstrip and the leader are coiled tightly about the take-up spool, the double thickness of the overlapping areas will not leave any pressure marks on the filmstrip.

5 Claims, 4 Drawing Sheets

FILM ASSEMBLAGE

BACKGROUND OF THE INVENTION

1. Field of the Invention

The invention relates generally to the field of photography, and more particularly to a film assemblage designed to prevent secured overlapping areas of a leader and a filmstrip from leaving any pressure marks on the filmstrip when the leader and the filmstrip are tightly wound into a roll.

2. Description of the Prior Art

It is known for a film assemblage to comprise an elongate filmstrip and a relatively shorter leader adhered together at respective overlapping areas. See, for example, U.S. Pat. No. 3,986,879, issued Oct. 19, 1976 and U.S. Pat. No. 780,283, issued Jan. 17, 1905. A problem arises, however, when the filmstrip and the leader are tightly wound into a roll with the leader forming the innermost convolution(s), such as when the filmstrip and the leader are wound onto a take-up spool in a camera. Specifically, the double thickness of the overlapping areas can leave a series of pressure marks on the successive imaging areas of the filmstrip.

SUMMARY OF THE INVENTION

According to the invention, there is provided an improved film assemblage wherein an elongate filmstrip and a relatively shorter leader are adhered together at respective overlapping areas, and wherein the improvement comprises:

at least one of said filmstrip and said leader has a hole that is located and dimensioned relative to said overlapping areas to insure registry with the overlapping areas to receive at least one of them when the leader and the filmstrip are tightly wound into a roll with the leader forming at least an innermost convolution of the roll.

More particularly, the filmstrip and the leader are adapted to be wound onto a take-up spool in a camera beginning with the leader and followed by the filmstrip. The overlapping areas and the hole have respective center-lines that extend across the width of the filmstrip and the leader and are spaced from each other a distance at least equal to the circumference of the take-up spool.

Since one of the overlapping areas is located in the hole when the filmstrip and the leader are tightly wound into a roll with the leader forming the innermost convolution(s), such as when the filmstrip and the leader are wound onto a take-up spool in a camera, the double thickness of the overlapping areas will not leave any pressure marks on the filmstrip.

DETAILED DESCRIPTION OF THE PREFERRED EMBODIMENT

The invention is described as being embodied in a 35 mm film cartridge and associated camera. Because such a cartridge and camera have become well known, this description is directed only to elements forming part of or cooperating directly with the preferred embodiment. It is to be understood, however, that elements not specifically shown or described may take various forms known to persons of ordinary skill in the art.

Figure 1:
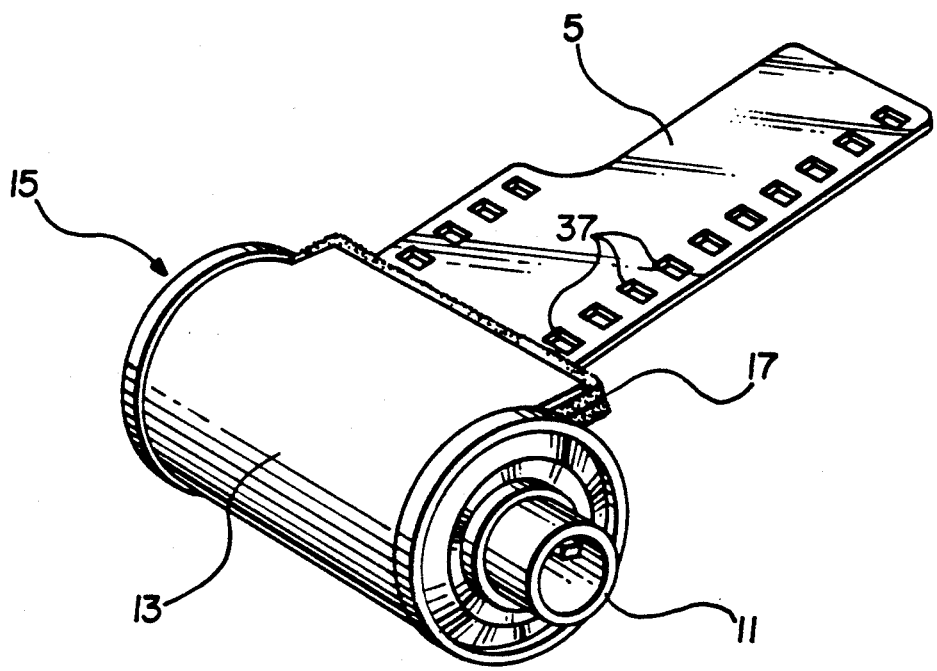
FIG. 1 is a perspective view of a 35 mm film cartridge including a film assemblage according to a preferred embodiment of the invention.
Figure 2:
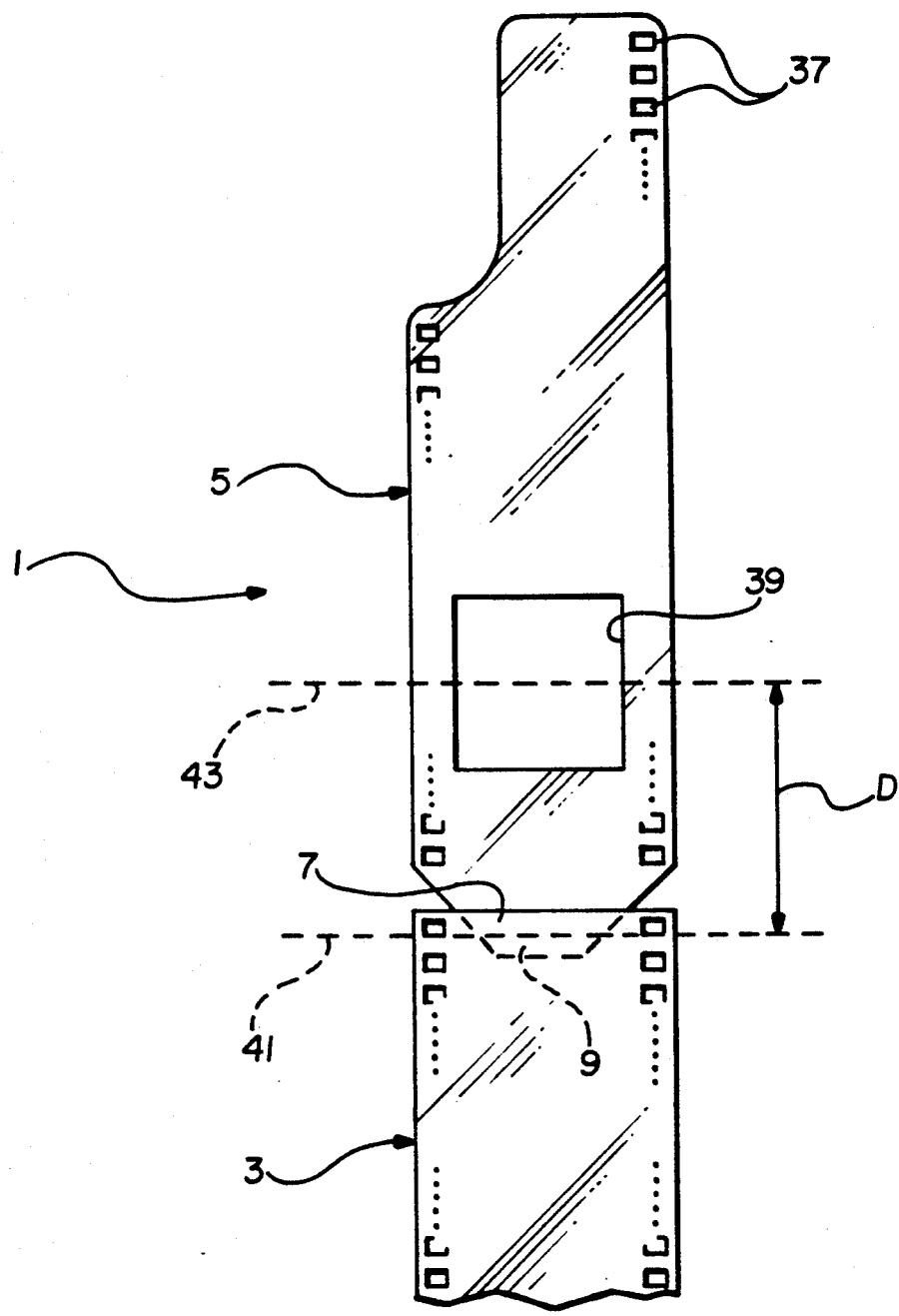
FIG. 2 is a plan view of a leader and a filmstrip comprising the film assemblage.

Referring now to the drawings, and specifically to FIGS. 1 and 2, a film assemblage 1 is shown comprising an elongate known 35 mm filmstrip 3 and a relatively shorter leader 5 which are adhered together, such as by splicing, at respective overlapping leading and trailing end areas 7 and 9. As is typical, the filmstrip 3 is stored on a film spool 11 rotatably supported within a hollow cylindrical shell 13 of a known film cartridge 15. Normally, the leader 5 (but not the filmstrip 3) partially extends through a light-trapping slit 17 in the shell 13 to the outside of the cartridge 15.

Figure 3:
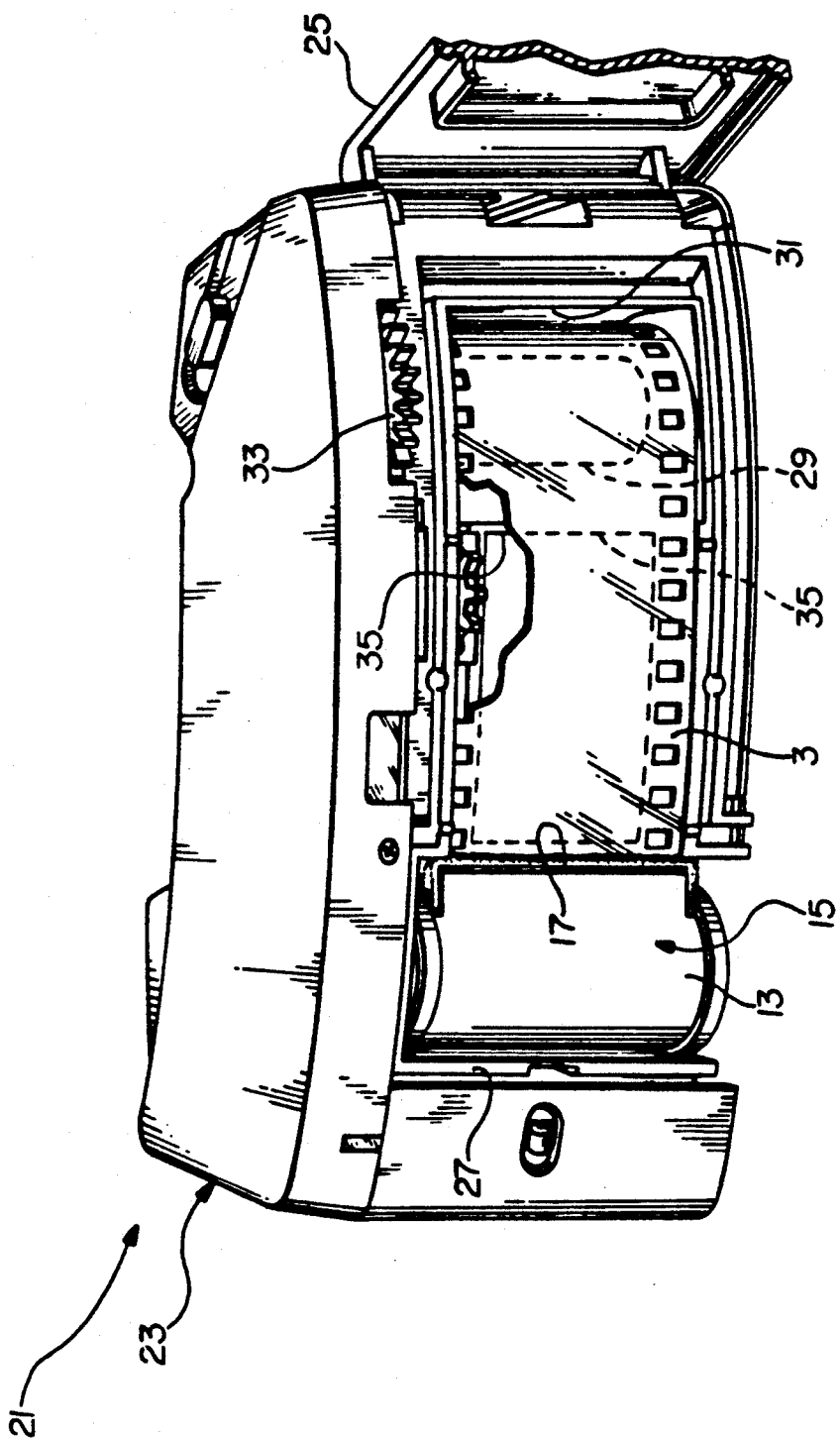
FIG. 3 is a rear perspective view of a camera in which the film assemblage is intended to be wound onto a take-up spool.

As shown in FIG. 3, a known 35 mm camera 21 has a housing or body 23 including a rear door 25 opened to reveal the cartridge 15 situated within a loading chamber 27 of the housing. A take-up spool 29 located in a take-up chamber 31 of the housing 23 is manually rotated via a thumbwheel 33, following each exposure of the filmstrip 3 at a backframe opening 35, to wind an exposed imaging area of the filmstrip onto the take-up spool and to advance an unexposed imaging area of the filmstrip from the cartridge 15 to the backframe opening. Although not shown, the take-up spool 29 may include peripheral teeth which are received in respective perforations 37 in the leader 5 to initially secure the leader to the take-up spool.

Figure 4:
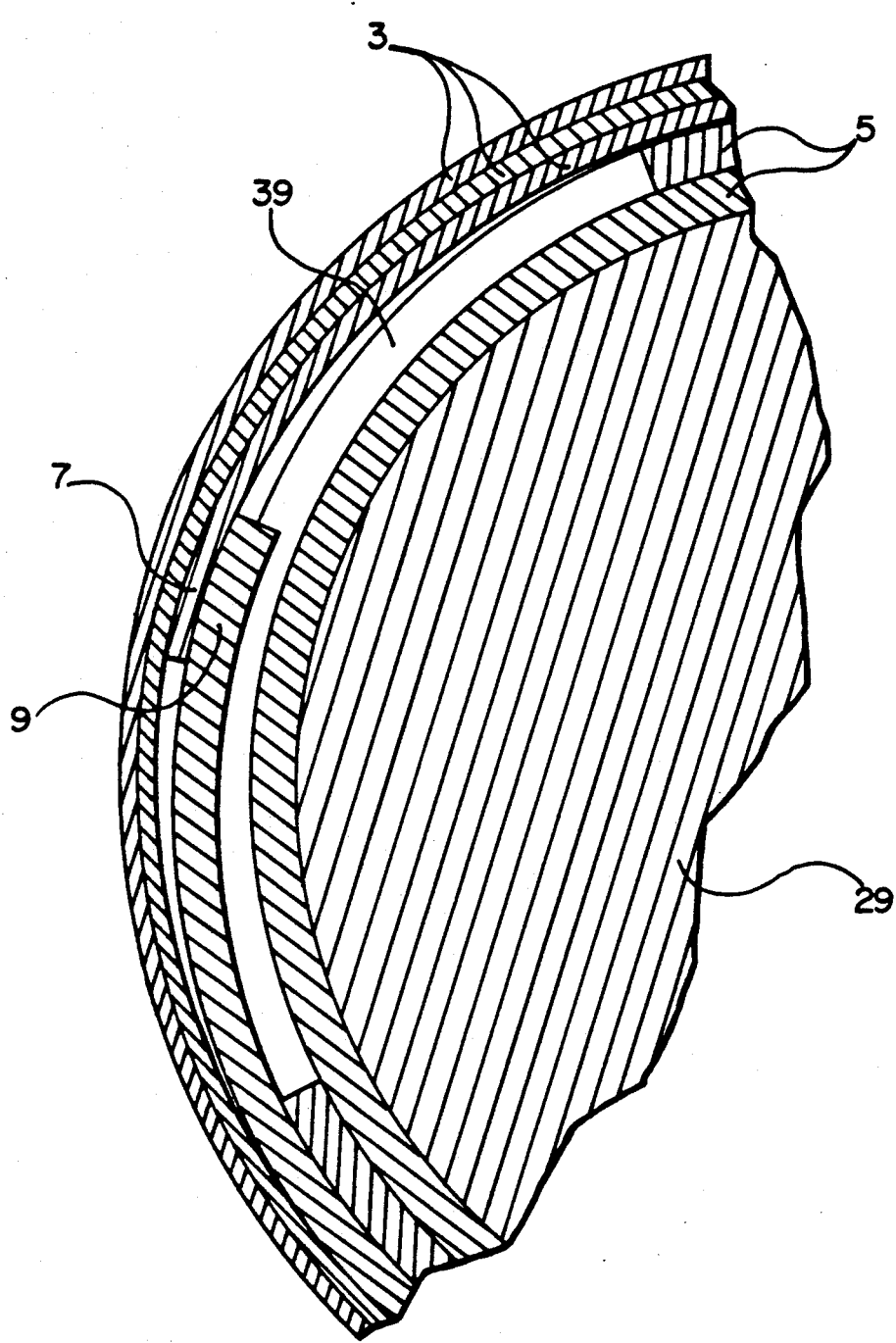
FIG. 4 is a sectional view of the leader and the filmstrip wound onto the take-up spool.

The leader 5 has a hole 39 that is located and dimensioned relative to the overlapping areas 7 and 9 of the filmstrip 3 and the leader to insure registry with each of the overlapping areas to receive at least the overlapping area of the leader when the leader and the filmstrip are wound onto the take-up spool 29 as shown in FIG. 4. In this instance, the leader 5 forms the innermost convolutions of the resulting film roll and the overlapping area 9 of the leader is located inwardly underneath the overlapping area of the filmstrip 3. Preferably, as shown in FIG. 2, the overlapping areas 7 and 9 and the hole 39 have respective center-lines 41 and 43 that extend across similar widths of the filmstrip 3 and the leader 5 and are spaced from each other a distance D at least equal to the circumference of the take-up spool 29.

Since at least the overlapping area 9 of the leader 5 is located in the hole 39 when the filmstrip 3 and the leader are tightly wound into a roll as shown in FIG. 4, the double thickness of the overlapping area of the leader and the overlapping area 7 of the filmstrip will not have any pressure marks on the filmstrip.

The invention has been described with reference to a preferred embodiment. However, it will be appreciated that variations and modifications can be made within the ordinary skill in the art without departing from the scope of the invention. For example, the hole 39 could be located in the filmstrip 3 instead of the leader 5.

I claim:

1. An improved film assemblage wherein an elongate filmstrip and a relatively shorter leader are adhered together at respective overlapping areas, and wherein the improvement comprises:

at least one of said filmstrip and said leader has a hole that is located and dimensioned relative to said overlapping areas to insure registry with the overlapping areas to entirely receive at least one of the overlapping areas when the leader and the filmstrip are tightly wound into a roll with the leader forming at least an innermost convolution of the roll.

2. The improvement as recited in claim 1, wherein said filmstrip and said leader are adapted to be wound onto a take-up spool in a camera beginning with the leader and followed by the filmstrip, and said overlapping areas and said hole have respective center-lines that extend across the width of said filmstrip and said leader and are spaced from each other a distance at least equal to the circumference of a take-up spool in a camera onto which the leader and the filmstrip are adapted to be wound.

3. An improved camera and film assemblage wherein an elongate filmstrip and a relatively shorter leader are adhered together at respective overlapping areas and are adapted to be wound onto a take-up spool beginning with the improvement comprises:

at least one of said filmstrip and said leader has a hole that is located and dimensioned with the overlapping areas to entirely receive at least one of the overlapping areas when the leader and the filmstrip are wound onto said take-up spool.

4. The improvement as recited in claim 1, wherein said take-up spool has a circumference, and said overlapping areas and said hole have respective center-lines that extend across the width of said filmstrip and said leader and are spaced from each other a distance at least equal to the circumference of said take-up spool.

5. An improved film assemblage wherein an elongate filmstrip and a relatively shorter leader are adhered together at respective overlapping areas and are adapted to be wound onto a take-up spool in a camera beginning with said leader and followed by said filmstrip, and wherein the improvement comprises:

the overlapping area of said leader is positioned to be located inwardly underneath the overlapping area of said filmstrip when the leader and the filmstrip are wound onto a take-up spool in a camera; and said leader has a hole that is located and dimensioned relative to the overlapping area of the leader to entirely receive the overlapping area of the leader when the leader and the filmstrip are wound onto a take-up spool in the camera.

* * * * *